(12) United States Patent
Trzaskos et al.

(10) Patent No.: US 9,064,200 B2
(45) Date of Patent: Jun. 23, 2015

(54) FLAT OBJECT EJECTOR ASSEMBLY

(75) Inventors: Piotr S. Trzaskos, Saratoga, CA (US); Justin Richard Wodrich, Saratoga, CA (US); Carl Peterson, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 760 days.

(21) Appl. No.: 13/166,735

(22) Filed: Jun. 22, 2011

(65) Prior Publication Data

US 2012/0195013 A1 Aug. 2, 2012

Related U.S. Application Data

(60) Provisional application No. 61/437,779, filed on Jan. 31, 2011.

(51) Int. Cl.
| | |
|---|---|
| *H05K 5/00* | (2006.01) |
| *H05K 13/00* | (2006.01) |
| *G06K 13/08* | (2006.01) |
| *B23P 11/00* | (2006.01) |
| *F16H 21/44* | (2006.01) |
| *H04M 1/02* | (2006.01) |

(52) U.S. Cl.
CPC ....... *G06K 13/0831* (2013.01); *Y10T 74/18896* (2015.01); *Y10T 29/49826* (2015.01); *Y10T 29/49002* (2015.01); *H04M 1/026* (2013.01); *H04M 2250/14* (2013.01)

(58) Field of Classification Search
CPC ................. G06K 13/0831; Y10T 29/49826; Y10T 29/49002; Y10T 74/18896; H04M 2250/14; H04M 1/026
USPC ................. 361/754, 727; 438/17; 439/159
See application file for complete search history.

(56) References Cited

U.S. PATENT DOCUMENTS

| | | | | |
|---|---|---|---|---|
| 3,866,990 | A * | 2/1975 | McRae | 312/9.25 |
| 3,969,007 | A * | 7/1976 | Lowry | 312/9.21 |
| 5,051,101 | A * | 9/1991 | Komatsu | 439/159 |
| 5,299,946 | A * | 4/1994 | Kusakabe | 439/159 |
| 5,443,395 | A * | 8/1995 | Wang | 439/159 |
| 5,655,917 | A * | 8/1997 | Kaneshige et al. | 439/155 |
| 6,027,350 | A * | 2/2000 | Chen et al. | 439/159 |
| 6,185,103 | B1 * | 2/2001 | Yamada | 361/727 |
| 6,343,945 | B1 * | 2/2002 | Liikanen | 439/160 |
| 6,609,918 | B2 * | 8/2003 | Uchikawa | 439/159 |
| 6,609,936 | B2 * | 8/2003 | Bricaud et al. | 439/630 |
| 6,729,893 | B2 * | 5/2004 | Ezaki | 439/159 |
| 6,749,448 | B2 * | 6/2004 | Bright et al. | 439/160 |
| 6,824,416 | B2 * | 11/2004 | Di Mascio | 439/352 |
| 6,991,480 | B2 * | 1/2006 | Katayanagi et al. | 439/159 |
| 7,681,210 | B2 * | 3/2010 | Jiang et al. | 720/638 |
| 7,837,486 | B2 * | 11/2010 | Li | 439/159 |
| 8,597,038 | B2 * | 12/2013 | Yokoyama et al. | 439/160 |
| 8,634,208 | B2 * | 1/2014 | Duan et al. | 361/807 |
| 2004/0092149 | A1 * | 5/2004 | Scuteri et al. | 439/326 |
| 2008/0064239 | A1 * | 3/2008 | Li | 439/152 |
| 2009/0267677 | A1 * | 10/2009 | Myers et al. | 327/356 |
| 2012/0196462 | A1 * | 8/2012 | Henry et al. | 439/159 |

* cited by examiner

*Primary Examiner* — David M Sinclair
*Assistant Examiner* — Theron Milliser
(74) *Attorney, Agent, or Firm* — Brownstein Hyatt Farber Schreck LLP (57) ABSTRACT

An apparatus for ejecting a flat object from a casing of a mobile device is disclosed. The apparatus is arranged to receive an ejection tool along a first axis and to eject the flat object along a second axis, wherein the first and second axes are not parallel. In one embodiment, the first axis is parallel to a top surface of the mobile device and the second axis is perpendicular to a curved edge surface of the mobile device.

19 Claims, 14 Drawing Sheets

FLAT OBJECT EJECTOR ASSEMBLY

CROSS REFERENCE TO RELATED APPLICATIONS

This application claims priority under 35 U.S.C. 119(e) to U.S. Provisional Patent Application Ser. No. 61/437,779, filed Jan. 31, 2011, entitled FLAT OBJECT EJECTOR ASSEMBLY, which is incorporated herein by reference in its entirety for all purposes.

TECHNICAL FIELD

The present invention relates generally to removable flat object storage within and removal from a mobile device casing. More particularly, a method and an apparatus are described for receiving an ejection tool perpendicular to one surface of a mobile device and ejecting a flat tray parallel to another surface of the mobile device.

BACKGROUND OF THE INVENTION

The proliferation of high volume manufactured, portable electronic devices has encouraged innovation in both functional and aesthetic design practices for enclosures that encase such devices. Manufactured devices can include a casing that provides an ergonomic shape and aesthetically pleasing visual appearance desirable to the user of the device. Edge surfaces of casings can be shaped to a geometry that melds curved sections seamlessly to a flat bottom surface, with no substantial flat sections along the edge surface. Openings in the edge surface of casings can accommodate removable flat objects, such as a memory card or a tray to hold the memory card. When the flat object is stored within the casing, the outer portion of the flat object can be formed to be contiguous with the curved surface of the casing providing a smooth uninterrupted surface. Mechanical ejection of the flat object can be effected by inserting an ejection tool into an opening in the casing adjacent to the flat object. To align the flat object with a circuit board inside the casing, the flat object can be oriented parallel to the circuit board, typically parallel to a flat top surface or flat bottom surface of the casing. As the edge surface of the casing can be not perpendicular to the flat surfaces of the housing, the flat object can be ejected in a direction that is not perpendicular to the curved edge surface of the casing, but rather parallel to one of the flat surfaces. To minimize the size of the opening in the curved edge surface of the casing that can receive the ejection tool adjacent to the flat object, the center of the opening can be oriented perpendicular to the curved edge surface of the casing. The angle of insertion of the ejection tool can be not parallel to the orientation of the flat object in the casing. Thus there exists a need for a method and an apparatus for ejecting a flat object through a surface of a casing along a direction that is not parallel to the direction of insertion of the ejection tool through an opening perpendicular to the surface of the casing.

SUMMARY OF THE DESCRIBED EMBODIMENTS

A flat object ejector assembly is disclosed which includes the following: a force receiving mechanism arranged to receive a force ($F_{input}$) along a first axis; and a flat object ejector including: a tray with a receiving area adapted to support a flat object; a tray contact area arranged to receive an ejection force ($F_{eject}$), the ejection force causing at least a portion of the tray to be exposed subsequent to an ejection event; and an arm mechanically attached to a pivot point. The arm receives a force ($F_{arm}$) at an arm input position from the force receiving mechanism, and the force ($F_{arm}$) acting at the arm input position causes a lever action to drive an ejection end of the arm with the ejection force ($F_{eject}$) against the tray contact area, such that the force ($F_{input}$) initiates the ejection event causing the tray and supported flat object to move in a direction along a second axis different than the first axis to partially expose a portion of the tray.

A method of assembling a mobile device, including the following steps: receiving a flat object ejector assembly; receiving a housing for a mobile device; installing the flat object ejector assembly; and mechanically attaching the flat object ejector assembly to an inside surface of the housing of the mobile device.

A flat object ejector assembly disposed within a housing having a sharply curved surface having a first normal vector, the flat object ejector assembly arranged to receive an ejection tool substantially parallel to the first normal that causes the flat object ejector assembly to partially eject a flat object from the sharply curved surface of the housing at an angle that is not collinear with the first normal vector, wherein the ejection tool causes an ejector mechanism to rotate about a single axis causing the flat object to partially eject.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

The present invention relates generally to removable flat object storage within and removal from a mobile device casing. More particularly, a method and an apparatus are described for receiving an ejection tool perpendicular to one surface of a mobile device and ejecting a flat tray parallel to another surface of the mobile device.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

High volume manufactured mobile devices can include casings with various geometrically shaped surfaces. Mobile devices can include portable media players, portable communication devices, and portable computing devices, such as an iPod®, iPhone® and iPad® manufactured by Apple, Inc. of Cupertino, Calif. Both the tactile and visual appearance of a mobile device can enhance the desirability of the mobile device to the consumer. A casing can be shaped and polished to a desired appearance having an aesthetically pleasing, ergonomic shape. In some embodiments, an edge surface of the casing of the mobile device can have an angled or variable curved surface that is not perpendicular to the top surface or bottom surface of the casing of the mobile device. The mobile device can include one or more openings in the case to accommodate removable objects, such as a tray to hold a subscriber identity module (SIM) card. When installed in the casing of the mobile device, in one embodiment, the removable object can form a continuous smooth closed face across the edge surface of the mobile device. The removable object can be ejected from the mobile device along an axis substantially parallel to a flat top surface of the mobile device. An opening in the casing to receive an ejection tool can be situated adjacent to the installed removable object. To minimize its size, the opening can be oriented along an axis perpendicular to the edge surface of the mobile device. As the edge surface can be not perpendicular to the flat top surface of the mobile device, an angle of insertion of the ejection tool through the opening in the casing can be along an axis different from the axis along which the removable object travels during removal from the mobile device. An apparatus described herein can convert a force received along one axis from the ejection tool to a force delivered along a separate axis to eject the removable object from the mobile device. The two axes can be not parallel to each other.

Figure 1A:
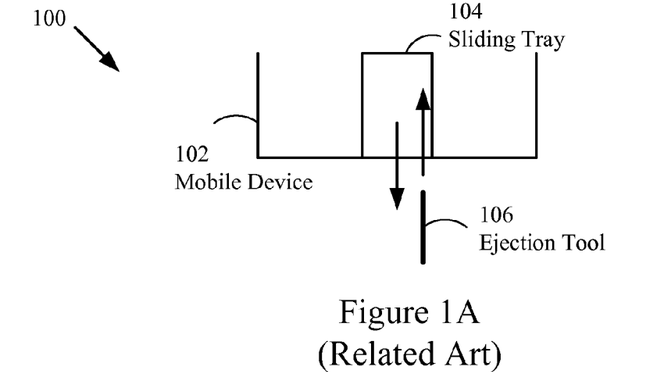
FIG. 1A illustrates a top view of a mobile device including a removable sliding tray.

FIG. 1A illustrates a top view 100 of a related art mobile device 102 having a sliding tray 104 that can be ejected from the mobile device 102 upon the insertion of an ejection tool 106. The ejection tool 106 can be inserted in a direction along an axis perpendicular to an edge surface of the mobile device 102, and the sliding tray 104 can be ejected at least partially from the mobile device 102 in a direction along an axis substantially parallel to the axis of insertion of the ejection tool. The axis can be parallel to a flat top surface and/or flat bottom surface of the mobile device 102. The top and bottom surfaces can be perpendicular to the edge surface of the mobile device 102.

Figure 1B:
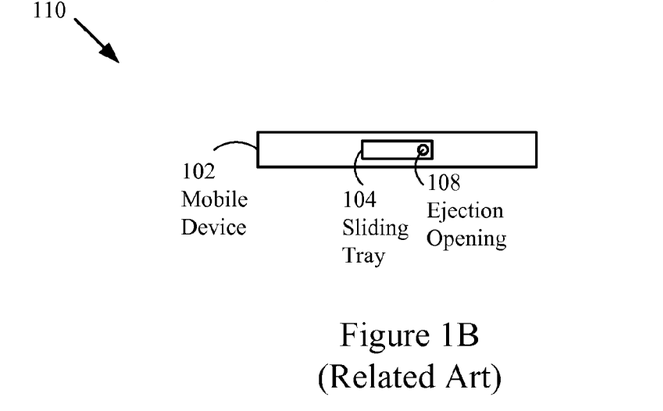
FIG. 1B illustrates a front view of the mobile device of FIG. 1A.

FIG. 1B illustrates a front view 110 of the mobile device 102. The front view 110 shows an ejection opening 108 positioned in the surface of the sliding tray 104 through which the ejection tool 106 can be inserted. The ejection opening can be circular to minimize its area. The length of the sliding tray 104 can be longer than the height of the mobile device 102, thus necessitating the orientation of the sliding tray parallel to the surface of the mobile device so that the sliding tray can be completely enclosed within the mobile device when inserted.

Figure 1C:
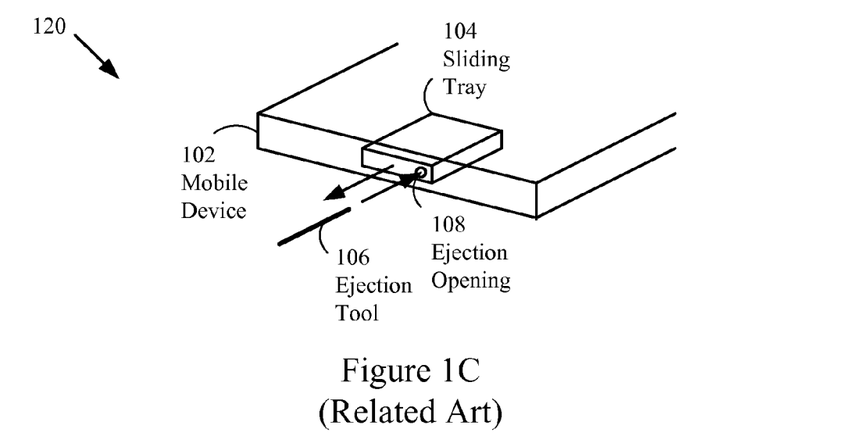
FIG. 1C illustrates a perspective view of the mobile device of FIG. 1A.

FIG. 1C further illustrates a perspective view 120 of the mobile device 102 shown in FIGS. 1A and 1B. The edge surface of the mobile device 102 can be perpendicular to the top surface, and the sliding tray 204 can be inserted and removed along a direction perpendicular to the edge surface. Similarly the ejection tool 206 can be inserted through the ejection opening 208 along an axis perpendicular to the edge surface. The insertion axis can be parallel to the ejection axis.

Figure 2A:
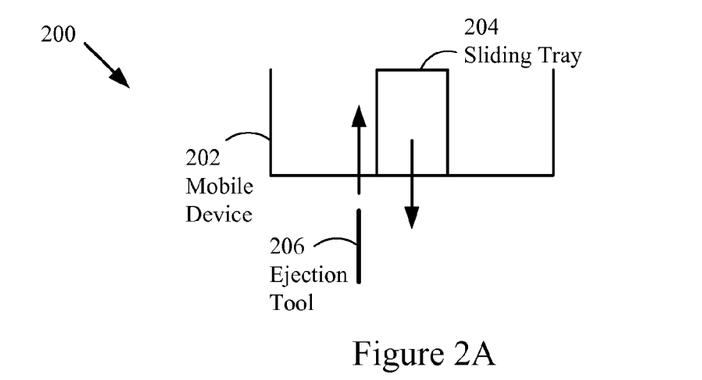
FIG. 2A illustrates a top view of another mobile device that includes a removable sliding tray.

FIG. 2A illustrates a top view 200 of a mobile device 202 having a sliding tray 204 that can be ejected from the mobile device 202 upon the insertion of an ejection tool 206. The ejection tool can be inserted in a direction along an axis perpendicular to an edge surface of the mobile device 102, and the sliding tray 104 can be ejected at least partially from the mobile device 102 in a direction along an axis substantially parallel to a flat top surface and/or flat bottom surface of the mobile device 202. The edge surface can be not perpendicular to the flat top surface or the flat bottom surface of the mobile device 202.

Figure 2B:
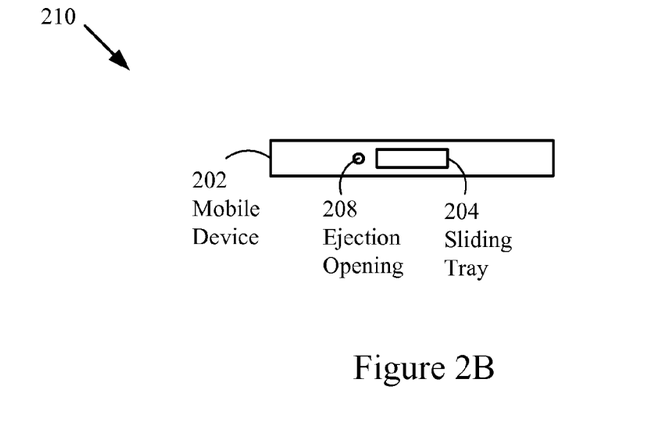
FIG. 2B illustrates a front view of the mobile device of FIG. 2A.

FIG. 2B illustrates a front view 210 of the mobile device 202 including an ejection opening 208 in a casing of the mobile device 202 adjacent to the sliding tray 204. The ejection opening 208 can be separate from the sliding tray 204 in the mobile device 202 to accommodate different axis orientations to those used in the prior art mobile device 102 illustrated in FIGS. 1A-C.

Figure 2C:
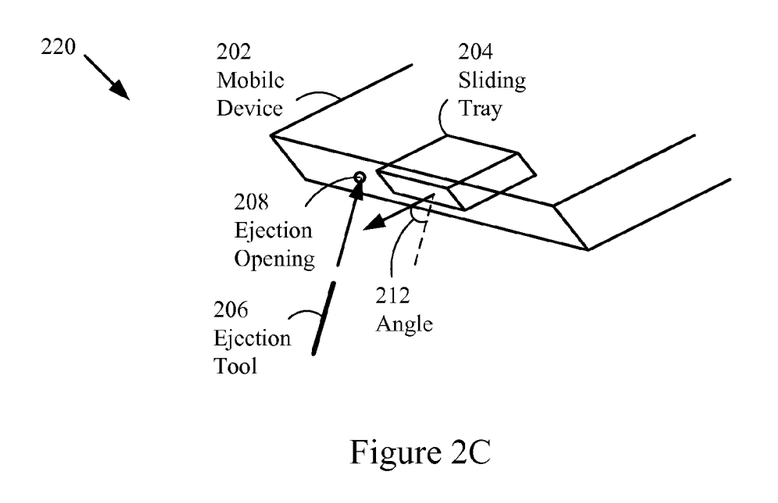
FIG. 2C illustrates a perspective view of the mobile device of FIG. 2A.

FIG. 2C illustrates a perspective view 220 of the mobile device 202 including the edge surface that is not perpendicular to the flat top surface or the flat bottom surface of the mobile device. The ejection opening 208 can be oriented such that the ejection tool 206 can be inserted in a direction along an axis normal to the edge surface of the mobile device. The axis of the insertion of the ejection tool 206 can subtend an angle 212 to an axis parallel to the direction along which the sliding tray 204 can be ejected from the mobile device 202. If the axis of the ejection tool were oriented parallel to the axis of movement of the sliding tray 204, an ejection opening in the angled edge surface of the mobile device 202 would be larger than the ejection opening 208 shown in FIG. 2C. A circular ejection opening 208 can be smaller than an elliptical ejection opening (not shown), thereby minimizing the ejection opening through the casing of the mobile device 202 to provide an aesthetically pleasing edge surface with minimal interruptions.

Figure 2D:
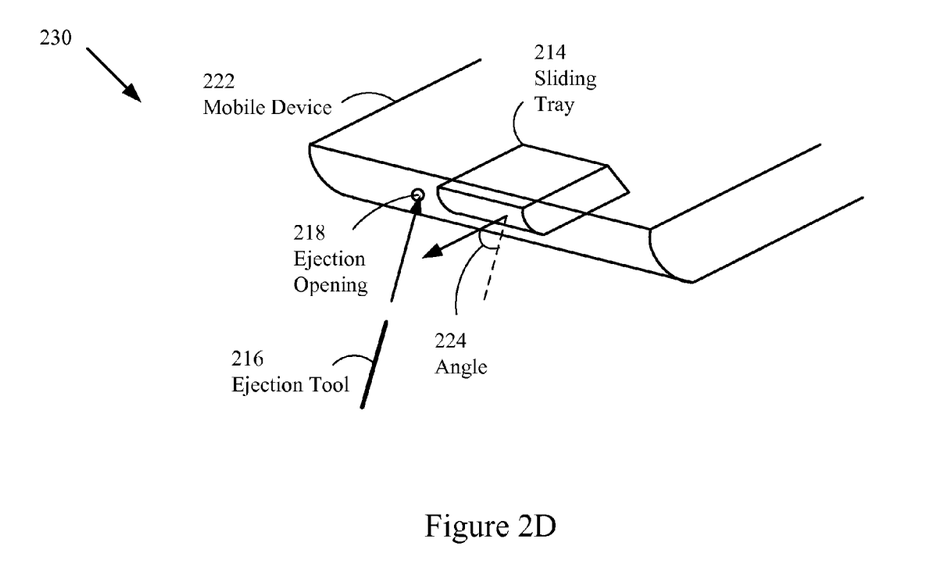
FIG. 2D illustrates a perspective view of a variant of the mobile device of FIG. 2A.

While FIG. 2C illustrates an angled edge surface for the casing of the mobile device 202, a curved edge surface can also be accommodated as shown by the perspective view 230 of a mobile device 222 in FIG. 2D. A sliding tray 214 in the mobile device 222 can have a curved edge surface along its front surface that can be continuous with the curved edge surface of the mobile device 222 providing a smooth uninterrupted edge surface for the mobile device 222. The sliding tray 214 can be ejected along an axis parallel to the top surface of the mobile device 222, while a center of an ejection opening 208 can be perpendicular to the edge surface of the mobile device. As with the mobile device 202 depicted in FIG. 2C, an ejection tool 216 can be inserted through an ejection opening 218 in the casing of the mobile device 222 in a direction along an axis at an angle 224 to the direction of movement of the sliding tray 214.

An apparatus that can convert a force due to an insertion of the ejection tool 206/216 into the ejection opening 208/218 into a force to push outward the sliding tray 204/214 can be realized using a few mechanical parts. The apparatus can accommodate repeated ejections, removals and re-insertions of the sliding tray 204/214 (or any similar flat object that can slide along guides outward from the mobile device 202/222. Because the amount of space available in the device is limited the apparatus can be designed to convert a short push by ejection tool 216 into a longer push of sliding tray 204/214, thereby ejecting the sliding tray 204/214 a sufficient amount so that a user can easily remove sliding tray 204/214 from the mobile device 202/222. As the volume available to accommodate the apparatus within the casing of the mobile device 202/222 can be limited, the apparatus can include relatively small parts manufactured from strong materials to withstand forces received upon repeated ejections. One or more surfaces of the parts can be coated with a lubricant to ensure smooth operation. For example, the ejection end of the arm upon rotation of the arm increases the distance the tray is pushed out by at least a factor of 1.5 as compared to a distance the ejection tool is pushed against the force receiving assembly.

While the description herein uses a sliding tray in a representative embodiment, any substantially flat object can be ejected using the apparatus and method described herein. The flat object can include multiple parts, such as a tray that can hold a secondary flat object, for example a memory card or subscriber identity module (SIM) card as used in a mobile communication device. The flat object can include recessed areas, joints, hollow areas, open sections and other features that can provide areas for pushing or pulling the flat object from the casing of the mobile device as well as guiding the flat object when ejected from or inserted into the casing of the mobile device. No particular limitation is intended by the use of the term sliding tray herein, and a person skilled in the art can understand the flat object to include equivalent objects suitable for ejection from and insertion into a mobile device.

Figure 3:
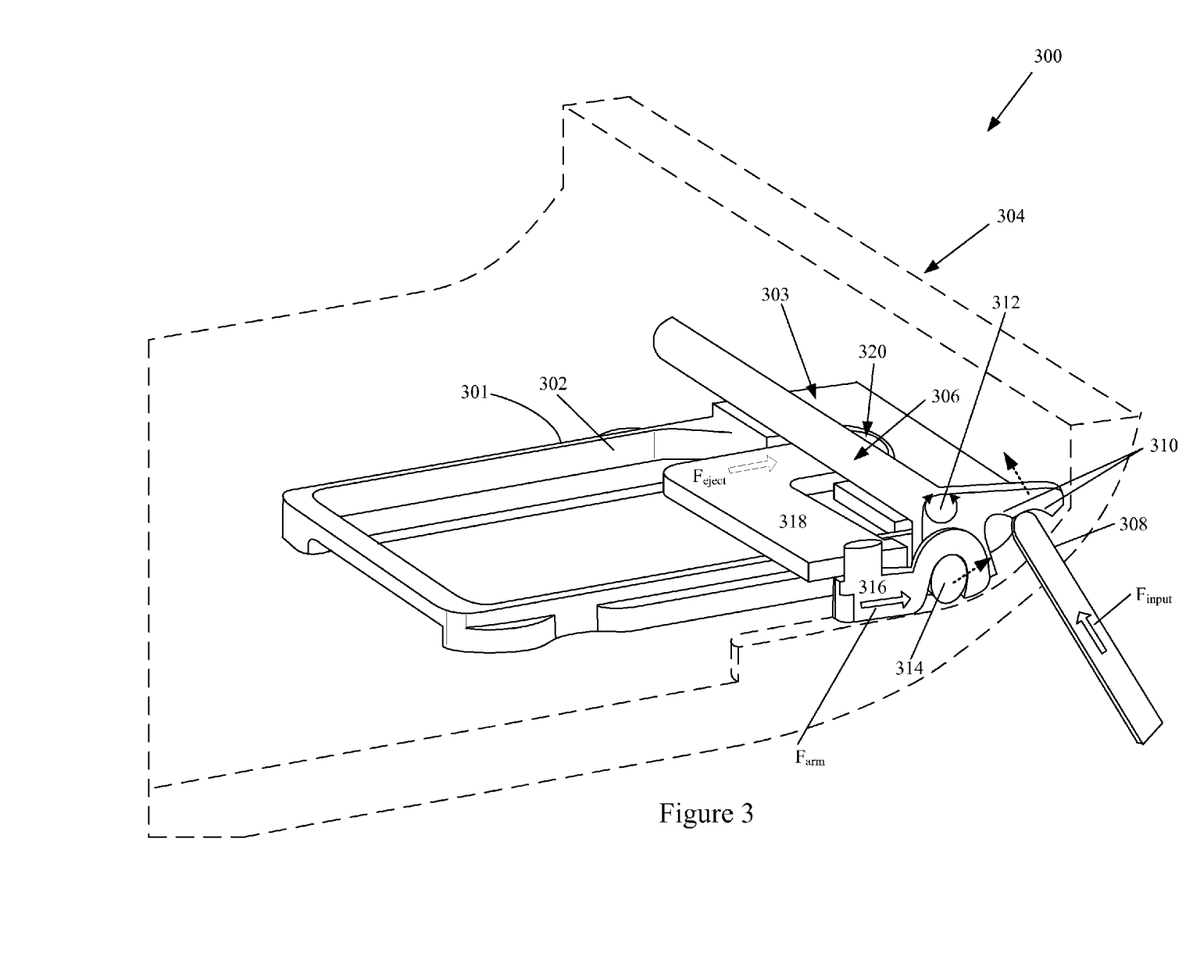
FIG. 3 illustrates a partial perspective view of one embodiment of the flat object ejector assembly in accordance with the described embodiment.

FIG. 3 illustrates a perspective view of a representative embodiment of an ejection apparatus arranged to eject a sliding tray 301 that includes tray body 302 and tray contact area 303 through an edge surface 304 of a mobile device (not shown). The apparatus can include a first pivot element (also referred to as crank) 306 that can receive an ejection tool 308 in an ejection tool acceptance region 310. The ejection tool 308 can be inserted through an opening in the edge surface 304 of the mobile device at an angle substantially perpendicular to the edge surface 304 of the mobile device. The edge surface 304 can be angled or curved with respect to the top surface of the mobile device, and thus the direction of insertion of the ejection tool 308 is generally not parallel to the top surface of the mobile device. The ejection tool acceptance region 310 can be shaped to capture a blunt end of the ejection tool 308. In one embodiment, the ejection tool acceptance region 310 can be concave shaped. In one embodiment, the ejection tool acceptance region 310 can be shaped in the form of a groove. In one embodiment, the ejection tool acceptance region 310 can be shaped to include at last two similarly lobe shaped regions.

Figure 4:
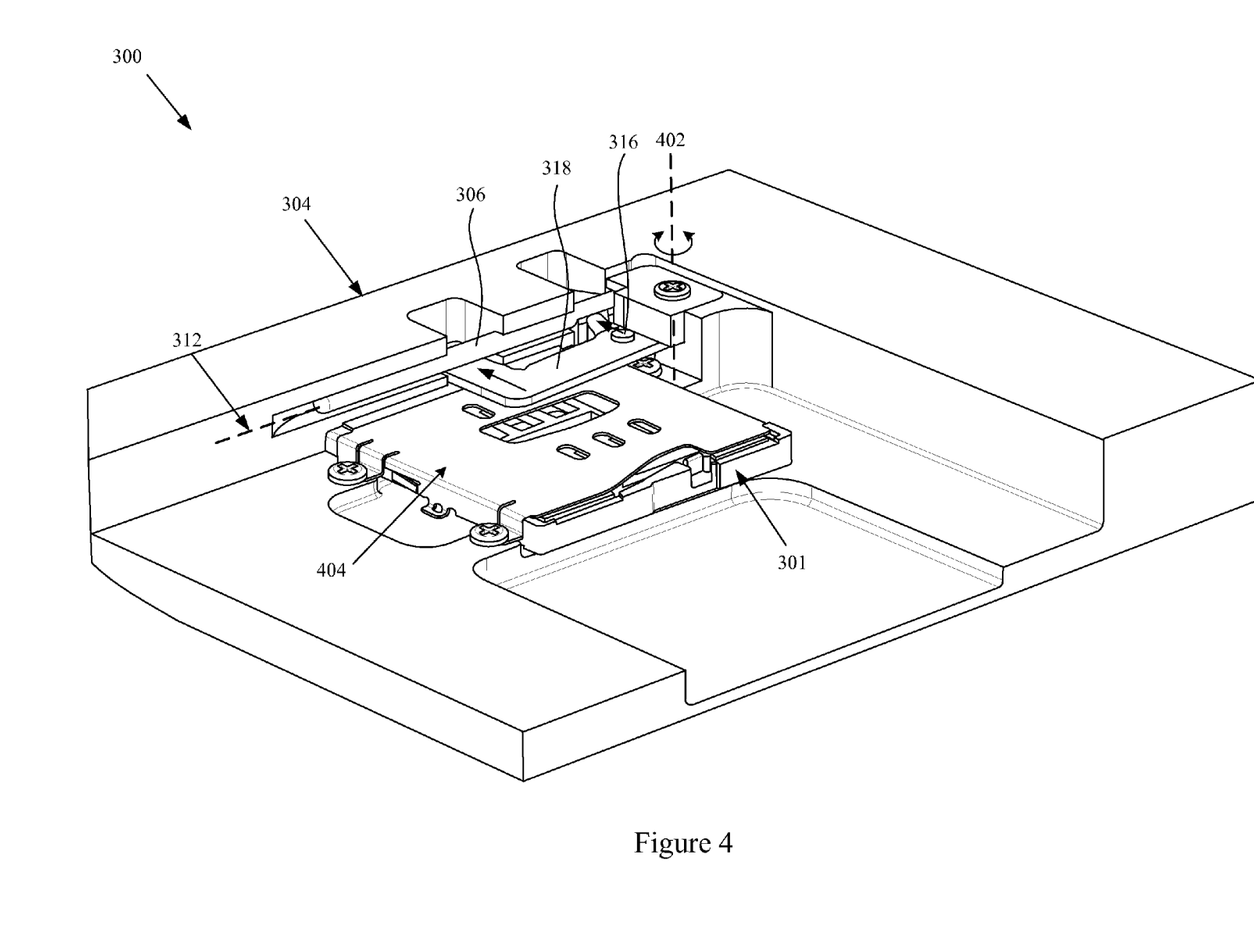
FIG. 4 illustrates a full perspective view of the embodiment from FIG. 3 from an alternate angle.
Figure 5A:
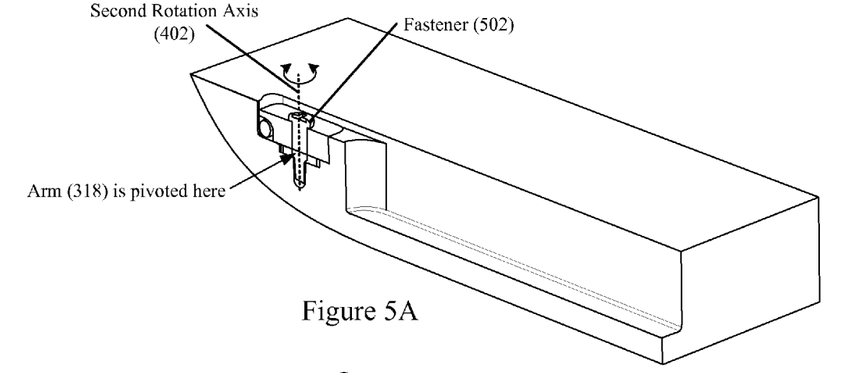
FIGS. 5A, 5B, and 5C illustrate an exploded view of the embodiment from FIG. 3, showing different cross sectional views of the embodiment.
Figure 5B:
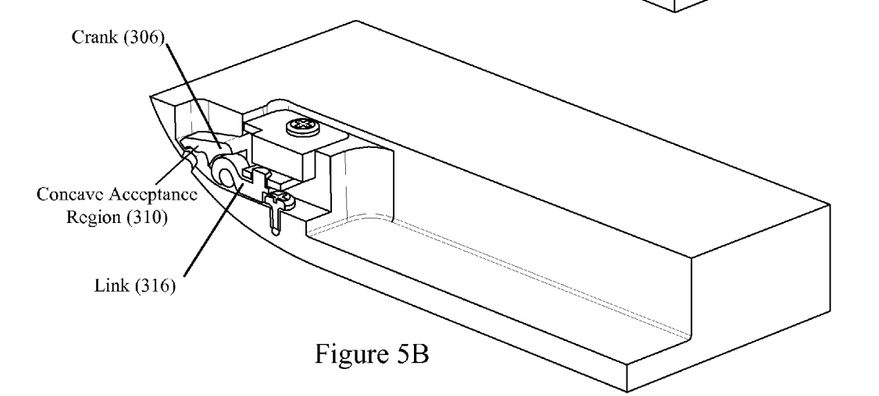
Figure 5C:
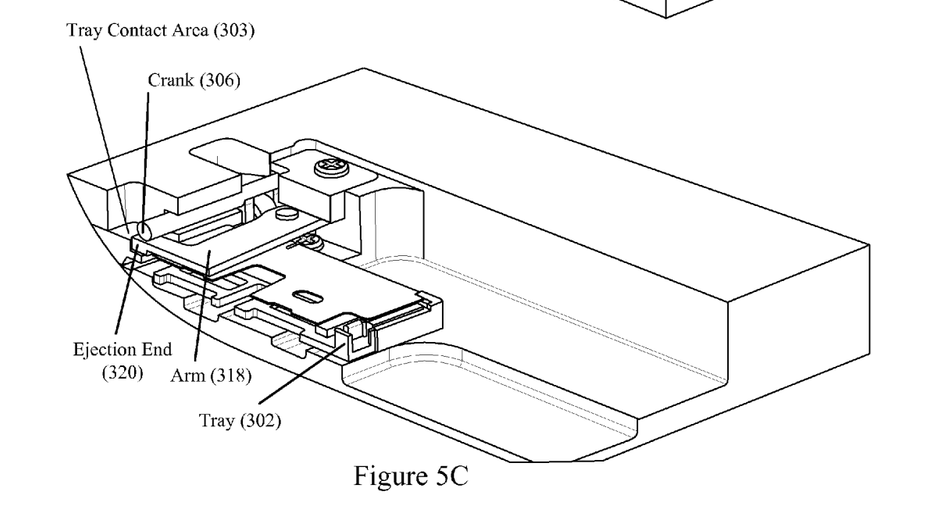

The first pivot element 306 can rotate about a first rotational axis 312 causing the ejection tool acceptance region 310 to rotate upward and a cylindrical section 314 of the first pivot element 306 connected to link 316 to rotate upward causing link 316 to exert force $F_{arm}$ onto arm 318 causing arm 318 to rotate about second rotational axis 320 (shown in FIGS. 4 and 5). Ejection end 320 of Arm 318 can contact tray contact area 303. Upon rotation of arm 318 about second rotational axis 320, ejection force $F_{eject}$ can be directly applied to tray contact area 303 by ejection end 320 causing tray 301 to move in the direction of ejection force $F_{eject}$. The movement of ejection end 320 of arm 318 in contact with tray contact area 303 can push against the tray contact area 303 thereby displacing tray 301 outward through edge surface 304 of the mobile device that can be along a direction substantially parallel to the top surface of the mobile device. The tray contact area 303 can be displaced a distance out of the edge 304 of the mobile device sufficient to remove the sliding tray manually from the mobile device. In one embodiment, the bottom of sliding tray contact area 303 can include an indentation sized and shaped to accept a removal tool (such as a portion of a finger or fingernail) for grasping and removing the tray 301 from the mobile device. In one embodiment and depending upon the size of the indentation, the sliding tray can move about 0.9 mm to about 1.5 mm away from edge surface 322.

In one embodiment the ejection tool insertion force can be approximately 6 Newtons, and the sliding tray ejection force can be approximately 3 Newtons. In one embodiment the first pivot element 306 and arm 318 can occupy a limited space inside the casing of the mobile device with limited travel distance available for rotational motion. In one embodiment, any section of the link 316 can travel less than 0.20 mm in linear distance upon rotation of first pivot element 306.

To operate for numerous ejections and insertions of the sliding tray 301, the first pivot element 306 and arm 318 can be manufactured from a material having sufficient strength to receive and transmit forces required. In one embodiment, the material can include precipitation hardened martensitic stainless steel. In another embodiment, the first pivot element 306 and arm 318 can be formed by a metal injection molding process and be composed of a "613 type" alloy stainless steel having a "condition 900" precipitation hardening. The precipitation hardening can also be known as secondary hardening and age hardening and can be used to significantly increase the yield strength of the metal alloy.

FIG. 4 shows another perspective view of ejection apparatus 300. FIG. 4 shows the entire device from a different angle, showing the relationship of second rotation axis 402 to first rotation axis 312 and arm 318. It shows how first pivot element 306 is supported by the housing of the portable device. Sliding tray housing 404 is also depicted, and is used to ensure the flat object stored in sliding tray 301 stays in place without regard to the orientation of the device.

FIG. 5 shows an exploded view of ejection apparatus 300 highlighting the relationships between various components. More specifically FIG. 5A shows how fastener 502 is anchored into the device housing. FIG. 5B shows how the concave acceptance region 310 and crank 306 fit into the device housing and how link 316 moves and interacts with crank 306 as it traverses across the inside of the device housing. FIG. 5C shows how arm 318 fits underneath crank 316, and gives a better idea for how ejection end 320 contacts tray contact area 303.

Figure 6:
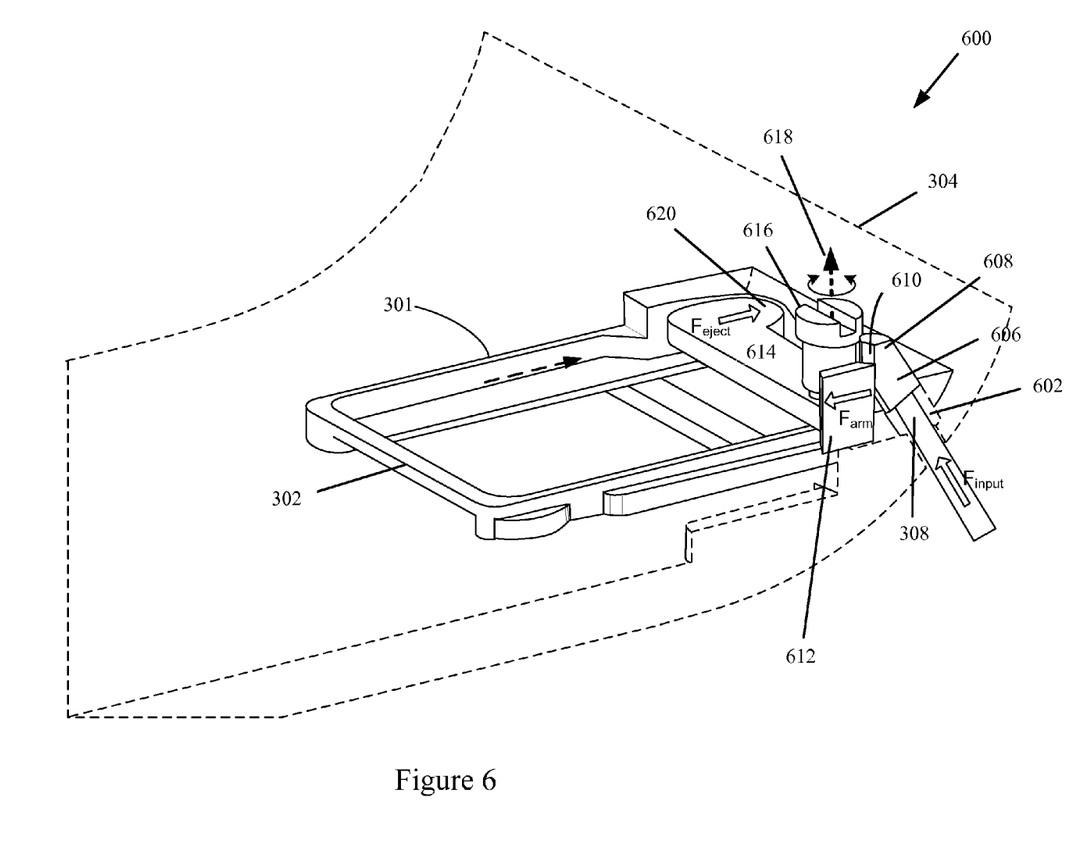
FIG. 6 illustrates a perspective view of a second embodiment of the flat object ejector assembly in accordance with the described embodiment.

FIG. 6 illustrates a perspective view of a representative embodiment of ejection apparatus 600 arranged to eject a sliding tray 301 that includes tray body 302 and tray contact area 303 through an edge surface 304 of the mobile device (not shown). Ejection tool 308 can be inserted into channel 602 formed to accommodate plunger 604. Plunger 604 can have body 606 formed to snugly fit within channel 602 having little likelihood of falling out from channel 602 since ejection tool insertion hole can be made narrower than the width of plunger 604. In one embodiment plunger 604 can have head portion 608 integrally formed with body 606. In one embodiment head portion 608 can be shaped to include angled surface 610 that can come into direction contact with arm input position 612 of arm 614 pivotally connected to the housing of the portable device by way of fastener 616. In one embodiment, angled surface 610 can be shaped in such a way that the motion of ejection tool 308 normal to the surface of the housing of the portable device can be redirected such that force $F_{arm}$ can be essentially directly parallel to a top (or bottom surface) of the portable device. Force $F_{arm}$ when applied to arm input position 612 of arm 614, can cause arm 614 to rotate about rotation axis 618 at fastener 616. In one embodiment, the rotation of arm 614 about rotation axis 618 can cause ejection end 620 of arm 614 to move in a substantially opposite direction than that of arm input position 612 of arm 614. In one embodiment, ejection end 620 can be shaped to conform to tray contact area 303 of tray 301 such that the movement of ejection end 620 can cause tray 301 to move a predetermined distance from edge 304 to expose a pre-selected amount of tray contact area 303 and in particular, the indentation in tray 301. In one embodiment, the predetermined distance can be on the order of about 0.9 to about 1.5 mm depending upon an amount of exposure desired for the indentation in tray 301. This distance is enough to allow a user to easily remove the tray with a fingertip.

Figure 7:
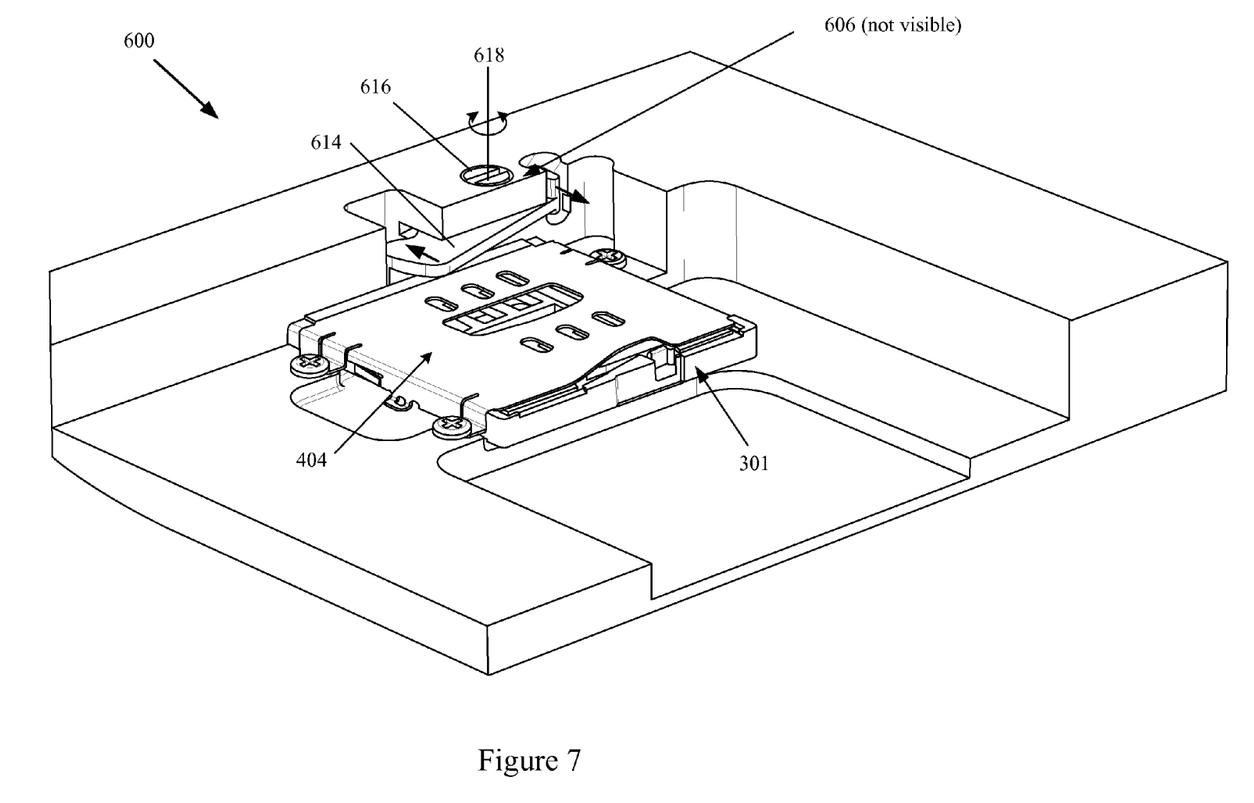
FIG. 7 illustrates a perspective view of the embodiment from FIG. 6 from an alternate angle.

FIG. 7 shows another perspective view of ejection apparatus 600. FIG. 7 shows the device from a different angle, showing the relationship of rotation axis 618 to arm 614. FIG. 7 shows how fastener 616 is attached to the device housing. Sliding tray housing 404 is also depicted, and is used to ensure the flat object stored in sliding tray 301 stays in place without regard to the orientation of the device.

Figure 8A:
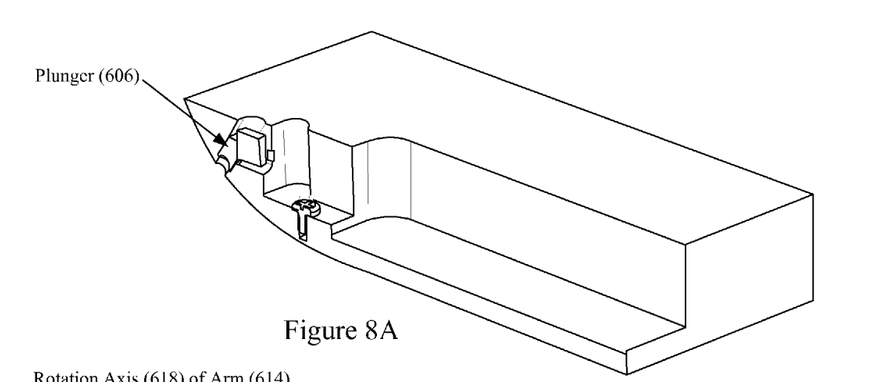
FIGS. 8A, 8B, and 8C illustrate an exploded view of the embodiment from FIG. 6, showing different cross sectional views of the embodiment.
Figure 8B:
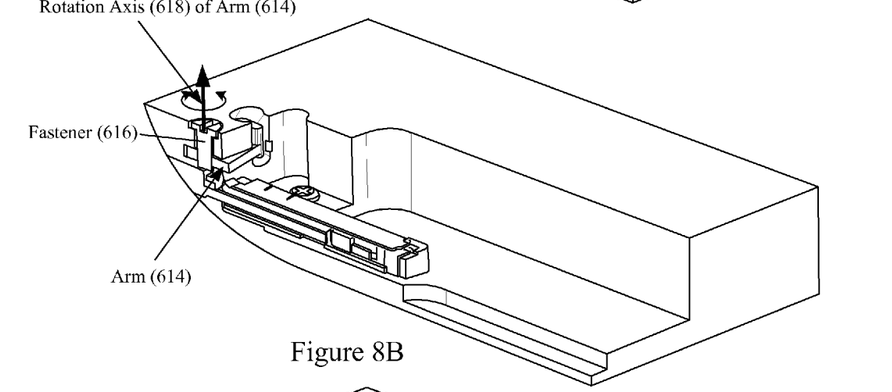
Figure 8C:
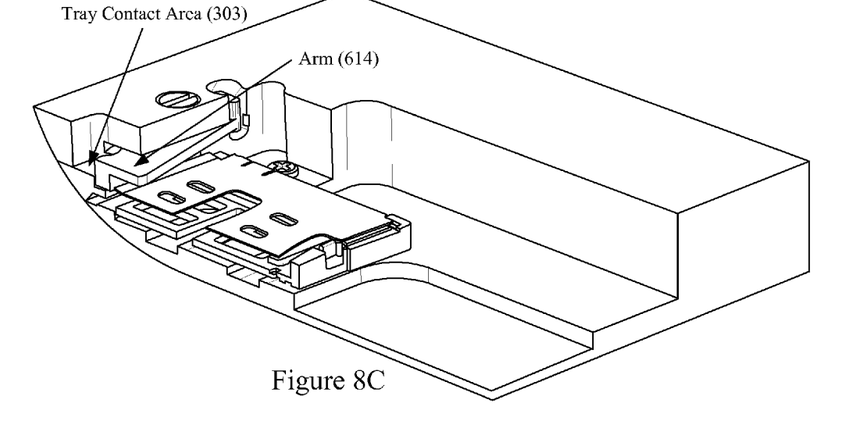

FIG. 8 shows an exploded view of ejection apparatus 600 highlighting the relationships between various components. More specifically FIG. 8A shows a cross section of plunger 604 and how it fits into channel 602. FIG. 8B shows how fastener 616 goes through arm 614, and is anchored into the device housing. FIG. 8C shows how ejection end 320 contacts tray contact area 303.

Figure 9:
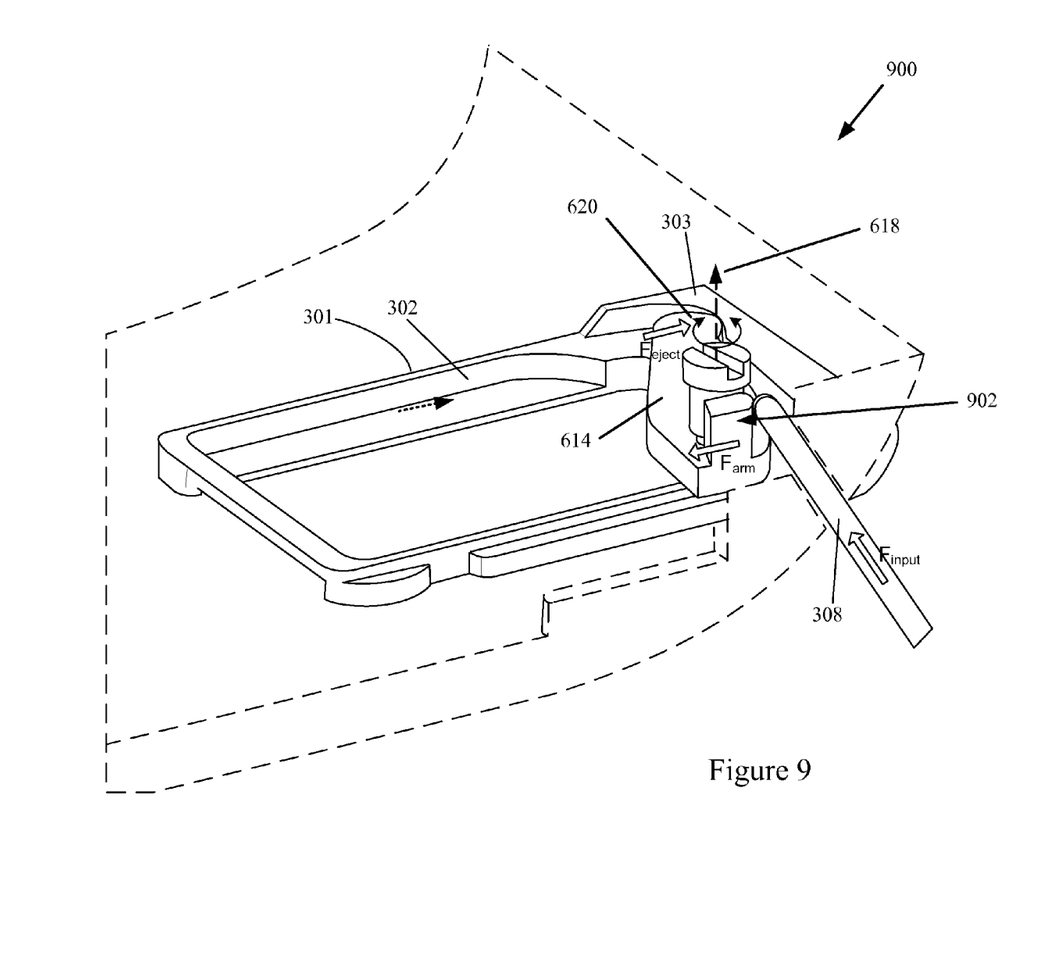
FIG. 9 illustrates a perspective view of a third embodiment of the flat object ejector assembly in accordance with the described embodiment.

FIG. 9 shows a perspective view of a representative embodiment of ejection apparatus 900 arranged to eject a sliding tray 301 that includes tray body 302 and tray contact area 303 through an edge surface 304 of the mobile device (not shown). Ejection apparatus 900 works much the same way to eject tray 301 as apparatus 600, except that the plunger has been eliminated such that ejection tool 308 directly applies ejection force $F_{arm}$ to ejection tool contact area 902 of arm 614 thereby reducing the number of components required.

Figure 10:
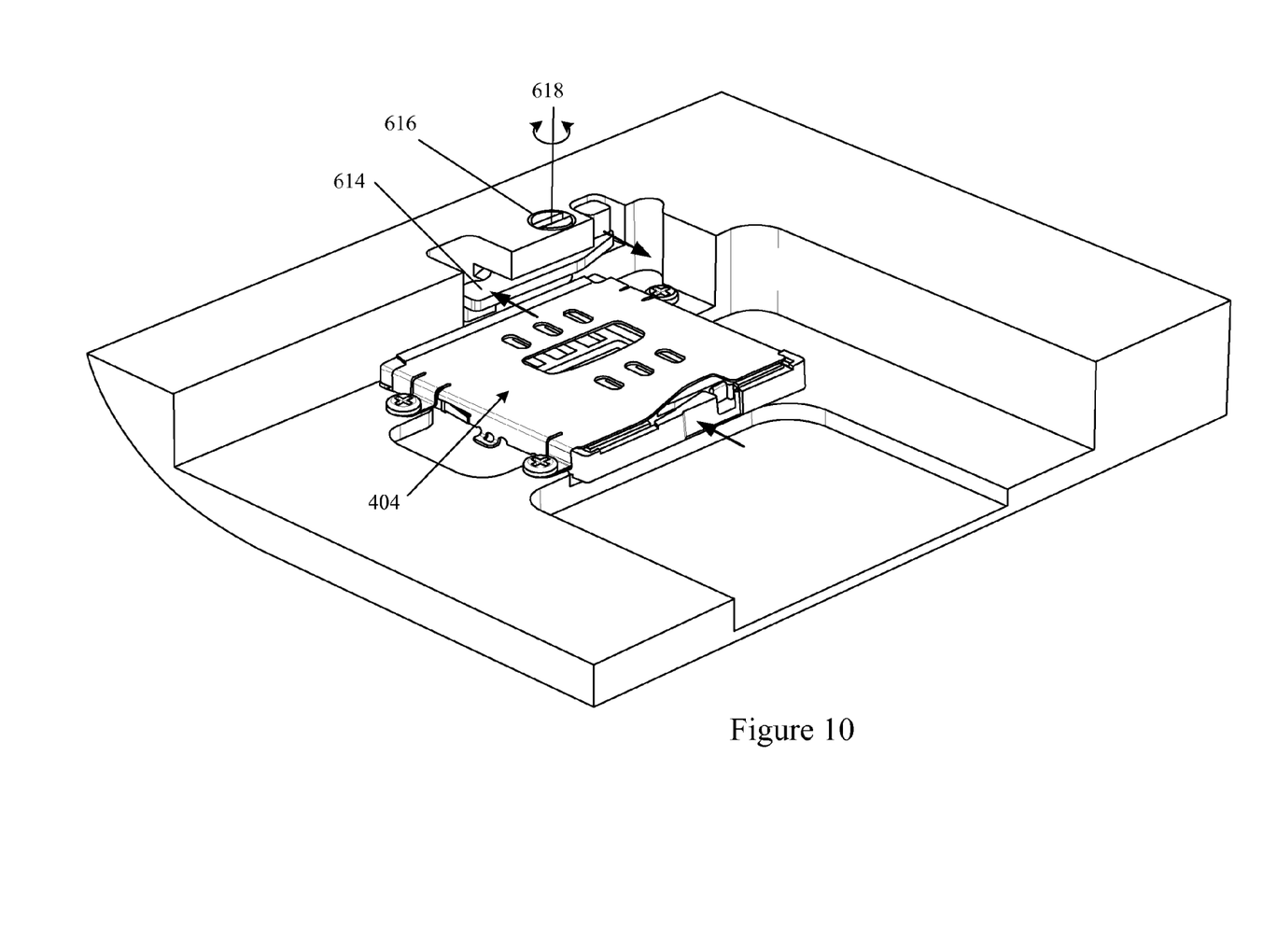
FIG. 10 illustrates a perspective view of the embodiment from FIG. 9 from an alternate angle.

FIG. 10 shows another perspective view of ejection apparatus 900. FIG. 10 shows the device from a different angle, showing the relationship of rotation axis 618 to arm 614. FIG. 10 shows how fastener 616 is attached to the device housing. Sliding tray housing 404 is also depicted, and is used to ensure the flat object stored in sliding tray 301 stays in place without regard to the orientation of the device.

Figure 11A:
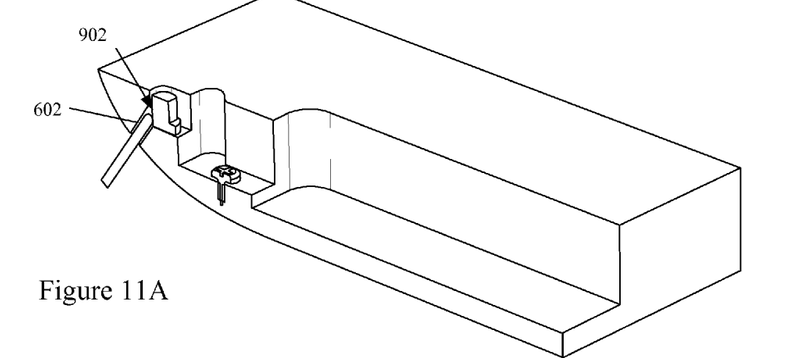
FIGS. 11A, 11B, and 11C illustrate an exploded view of the embodiment from FIG. 6, showing different cross sectional views of the embodiment.
Figure 11B:
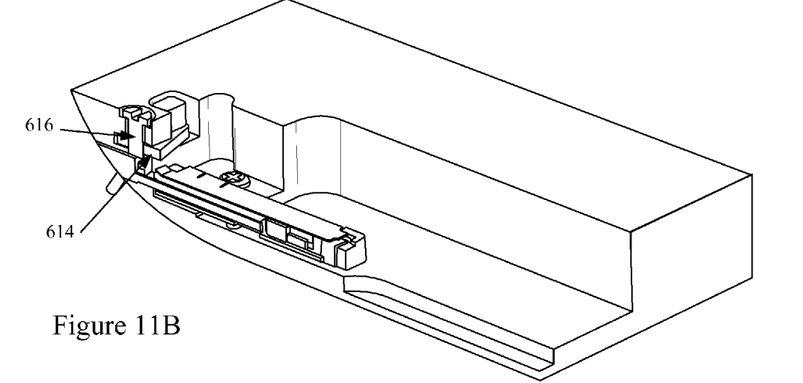
Figure 11C:
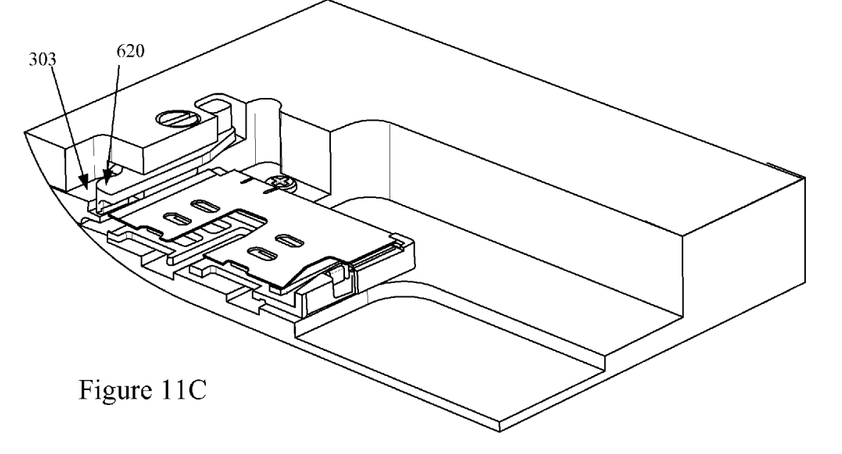

FIG. 11 shows an exploded view of ejection apparatus 900 highlighting the relationships between various components. More specifically FIG. 11A shows a cross section of ejection tool contact area 902 and how it is lined up with channel 602. FIG. 11B shows how fastener 616 goes through arm 614, and is anchored into the device housing. FIG. 8C shows how ejection end 620 of arm 318 contacts tray contact area 303.

Figure 12:
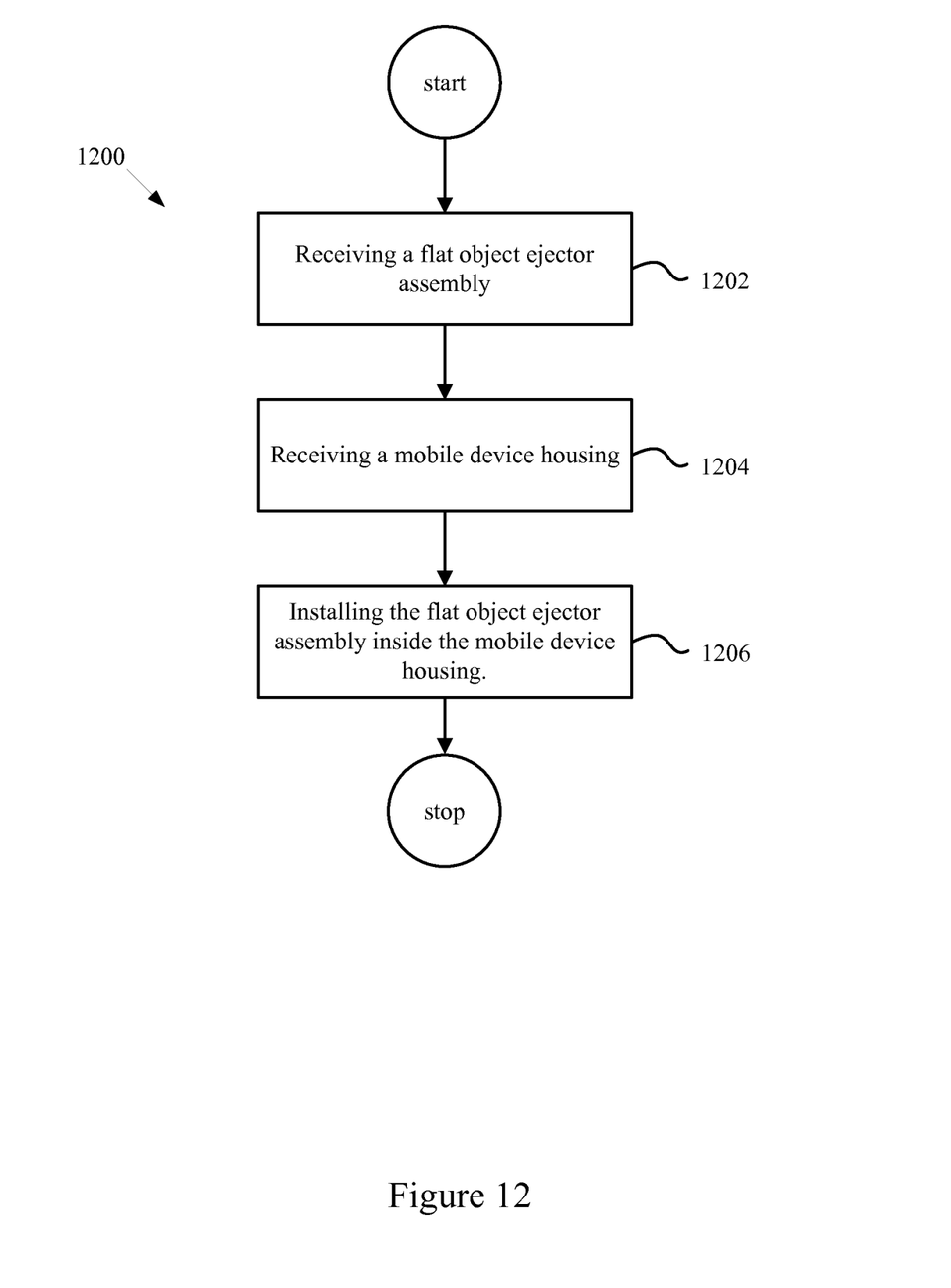
FIG. 12 shows a flowchart detailing a manufacturing process for installing a flat object ejector in a mobile device.

FIG. 12 shows a flowchart detailing a manufacturing process 1200 for installing a flat object ejector into a mobile device. Process 1200 begins at step 1202 by receiving a flat object ejector assembly. The flat object ejector assembly can include any of the three embodiments described above. In step 1204 a mobile device housing is received. The mobile device can include, for example, smart phones, tablet devices, portable media players, and so on. In step 1206 the flat object ejector assembly is installed within and attached to the mobile device housing.

Figure 13:
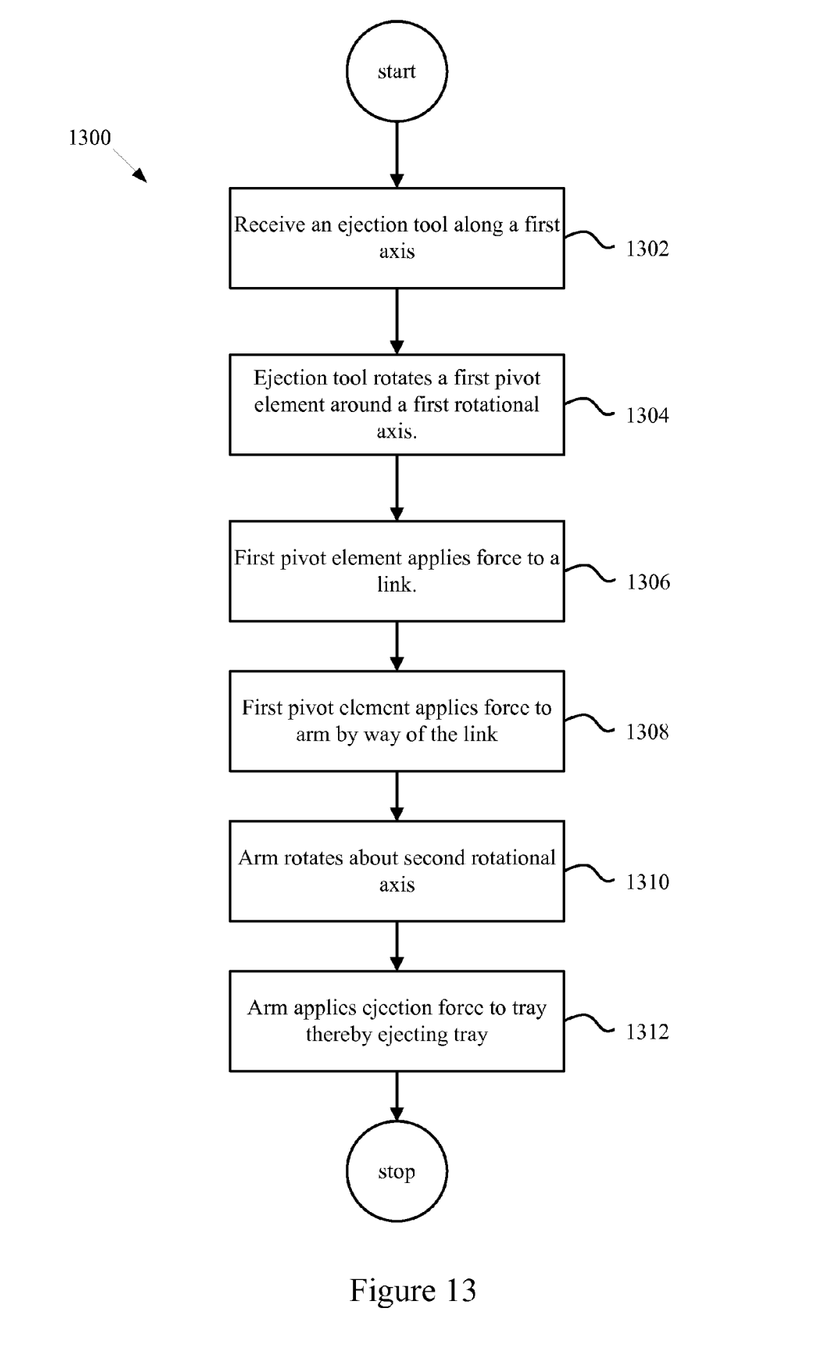
FIG. 13 shows a flowchart detailing an ejection process in accordance with the described embodiments.

FIG. 13 illustrates steps in a representative embodiment of a method to eject a flat object from the casing of a mobile device. These steps show the process for carrying out the steps from the most complex embodiment, shown in FIG. 3. The flat object can include a memory card, a tray that can hold a SIM card or similar object. In step 1302, an apparatus in the mobile device can receive an ejection tool inserted along a first axis. The ejection tool can be received in a concave section of a first pivot element. In one embodiment, the direction of insertion of the ejection tool can be along an axis perpendicular to the center of an opening in the casing of the mobile device. The casing of the mobile device can be shaped along a curve in an area surrounding the opening. In one embodiment, the first axis of insertion can be not parallel to a top surface or bottom surface of the casing of the mobile device. The first axis can also be not parallel to a circuit board positioned inside the casing of the mobile device adjacent to the opening. In step 1304 the first pivot element can rotate about a first rotational axis in response to the insertion of the ejection tool. The first pivot element can engage a link 1306 connected to an arm. In step 1308, rotation of the first pivot element can apply ejection force $F_{arm}$ to the arm by way of the link, causing the arm to rotate about a second axis substantially perpendicular to the first axis in 1310. The rotation of the arm can cause ejection force $F_{eject}$ to eject the SIM tray at 1312.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A flat object ejector assembly, comprising:
 a force receiving mechanism arranged to receive an input force from an ejection tool inserted through an opening in the housing of a portable electronic device, the opening oriented along a first direction;
 a flat object ejector, comprising:
  a tray adapted to support a flat object;
  a contact area arranged to receive an ejection force; and
  an arm mechanically attached to a pivot point;
 wherein the arm receives an arm force, at an arm input position, from the force receiving mechanism in response to the input force, and further wherein the arm force, acting at the arm input position, causes a lever action to drive an ejection end of the arm to impart an ejection force against the contact area thereby causing the tray and flat object to move in a second direction not parallel to the first direction to expose a portion of the tray.

2. The flat object ejector assembly as recited in claim 1 wherein the first direction is positioned at an angle greater than 30 degrees from the second direction.

3. The flat object ejector assembly as recited in claim 1 wherein the first direction is perpendicular to an edge surface of the portable electronic device, and the second direction is parallel to a top surface of the portable electronic device.

4. The flat object ejector assembly of claim 3, wherein the force receiving mechanism comprises:
   a pivot element arranged to receive the ejection tool in a concave acceptance region of the pivot element and arranged to rotate about a first rotational axis thereby contacting a cylindrical section of the first pivot element to a link which slides forward with the rotation of the first pivot element;
   wherein the link is also mechanically connected to the arm at the arm input position, and the arm input position is located on the same side of the pivot point as the ejection end of the arm, causing the ejection end of the arm to move in the same direction as the arm input position while the arm pivots around a second rotational axis, and wherein the first and second rotational axes are perpendicular.

5. The flat object ejector assembly of claim 3, wherein the force receiving mechanism comprises:
   a plunger arranged inside the opening to receive the input force from the ejection tool along the first direction, the plunger comprising:
      a surface to receive the ejection tool, and an angled surface in contact with the arm input position, wherein the pivot point of the arm is located between the arm input position and the ejection end of the arm, causing the ejection end of the arm to move in a direction opposite to the arm input position, and wherein the arm rotates in a plane parallel to the top surface of the portable electronic device.

6. The flat object ejector assembly of claim 3, wherein the force receiving mechanism comprises:
   an ejection tool contact area located at the arm input position, and arranged to receive the input force from the ejection tool along the first direction;
   wherein the pivot point of the arm is located between the arm input position and the ejection end of the arm, causing the ejection end of the arm to move in a direction opposite to the arm input position, and wherein the arm rotates in a plane parallel to the top surface of the portable electronic device.

7. The flat object ejector assembly of claim 1 wherein the flat object is a subscriber identity module (SIM) card.

8. The flat object ejector assembly of claim 7 wherein the tray positions the SIM card to contact a circuit board inside the portable electronic device.

9. The flat object ejector assembly of claim 1 wherein the flat object is a memory card.

10. The flat object ejector assembly of claim 6 wherein the ejection end of the arm upon rotation of the arm increases the distance the tray is pushed out by at least a factor of 1.5 as compared to a distance the ejection tool is pushed against the force receiving assembly.

11. The flat object ejector assembly of claim 1 wherein the flat object ejector assembly is incorporated into a housing of a small form factor device.

12. A flat object ejector assembly disposed within a housing, the flat object ejector assembly comprising:
   a tray for receiving the flat object through a first aperture within the housing and at a first angle;
   an ejector positioned proximate to the first aperture within the housing; and
   a receiving portion for receiving an ejector tool inserted through a second aperture in the housing, the second aperture oriented at a second angle not parallel to the first angle;
   wherein, in response to receiving the ejector tool, the receiving portion is configured to cause a lever action to impart an ejection force against a portion of the ejector to partially rotate about an axis and thereby eject the flat object through the first aperture at the first angle.

13. The flat object ejector assembly of claim 12, wherein the housing is at least partially curved.

14. The flat object ejector assembly of claim 12, wherein the flat object comprises a tray configured to hold an electronic component.

15. The flat object ejector assembly of claim 14, wherein the electronic component comprises a SIM card.

16. The flat object ejector assembly of claim 14, wherein the electronic component comprises a memory card.

17. The flat object ejector assembly of claim 14, wherein the electronic component comprises one or more electrical contacts.

18. The flat object ejector assembly of claim 17, wherein the tray is configured to align the one or more electrical contacts with a corresponding one or more electrical contacts within the housing.

19. A flat object ejection apparatus comprising:
   an ejector for receiving a flat object inserted at an insertion angle into an object aperture of a curved surface to which the flat object ejection apparatus is coupled; and
   an ejector tool acceptance region for accepting an ejector tool inserted through a tool aperture of the curved housing, the tool aperture oriented oblique to the insertion angle;
   wherein:
      the ejector tool acceptance region is configured to pivot about an axis in response to accepting the ejector tool so as to cause a lever action to impart an ejection force against the flat object, thereby ejecting the flat object from the object aperture at an angle opposite the insertion angle.

* * * * *